(12) United States Patent
Matousek et al.

(10) Patent No.: US 7,371,162 B2
(45) Date of Patent: May 13, 2008

(54) SIEVE ADJUSTMENT MECHANISM FOR AN AGRICULTURAL COMBINE

(75) Inventors: Robert A. Matousek, Milan, IL (US); Dohn W. Pfeiffer, Davenport, IA (US); Kevin S. Schwinn, Orion, IL (US)

(73) Assignee: CNH America LLC, New Holland, PA (US)

( * ) Notice: Subject to any disclaimer, the term of this patent is extended or adjusted under 35 U.S.C. 154(b) by 96 days.

(21) Appl. No.: 11/409,770

(22) Filed: Apr. 24, 2006

(65) Prior Publication Data

US 2007/0249414 A1    Oct. 25, 2007

(51) Int. Cl.
*A01F 12/32* (2006.01)
*B07B 1/00* (2006.01)

(52) U.S. Cl. ..................................... 460/101
(58) Field of Classification Search .............. 460/101, 460/109, 94, 42, 69, 97; 209/394
See application file for complete search history.

(56) References Cited

U.S. PATENT DOCUMENTS

| | | |
|---|---|---|
| 748,562 A | 12/1903 | Rowe |
| 886,247 A | 4/1908 | Rechtenbach |
| 1,217,364 A | 2/1917 | Stuckel |
| 1,956,507 A | 4/1934 | Johnson |
| 3,385,438 A | 5/1968 | Fisher |
| 4,712,568 A * | 12/1987 | Strong et al. ............... 460/69 |
| 5,525,108 A | 6/1996 | Rouse et al. |
| 5,795,223 A * | 8/1998 | Spiesberger et al. ........ 460/102 |
| 5,984,777 A | 11/1999 | Kuchar |
| 6,012,276 A | 1/2000 | Walker et al. |
| 6,468,154 B1 * | 10/2002 | Eggenhaus et al. ......... 460/101 |
| 6,579,172 B2 * | 6/2003 | Lauer ....................... 460/101 |
| 6,585,584 B2 | 7/2003 | Buermann |
| 6,632,136 B2 | 10/2003 | Anderson et al. |
| 7,029,392 B2 * | 4/2006 | Jonckheere et al. ......... 460/42 |

* cited by examiner

*Primary Examiner*—Árpád Fábián Kovács
(74) *Attorney, Agent, or Firm*—Patrick M. Sheldrake

(57) ABSTRACT

An adjustment mechanism for opening size of sieve segments of the cleaning system of an agricultural combine disposed in end to end relation, which allows jointly adjusting the sieve sizes, or separate adjustment, and which allows easy and convenient removal and reinstallation of the sieve segments. The mechanism includes an adjusting element in connection with each of the sieve segments, which is movable in a predetermined manner for effecting adjustments in the opening size thereof. Connecting elements connect together the adjusting elements for joint adjustment, and are disconnectable to allow individual adjustment. The predetermined manner of movement can be, for instance, a simple rotational movement, and the connecting elements can include and elongate connecting element, such as a rod or tube which can extend over a substantial portion of the sieve segments.

18 Claims, 7 Drawing Sheets

SIEVE ADJUSTMENT MECHANISM FOR AN AGRICULTURAL COMBINE

TECHNICAL FIELD

This invention relates generally to an adjustment mechanism or system for a grain cleaning sieve or sieves of a cleaning system of an agricultural combine, and more particularly, to a mechanism which allows selectively jointly or separately adjusting the sieve opening size or position of discrete segments or regions of a sieve.

BACKGROUND ART

It is well known to provide a sieve or sieves in the grain cleaning system of an agricultural combine. Typically, the cleaning system will consist of two sieves, an upper or coarser sieve or chaffer located below the threshing mechanism or separator of the combine and having larger sieve openings for the passage of grain and smaller pieces of plant material therethrough but relatively little of the larger chaff, and a lower finer sieve located below the chaffer for receiving the grain and smaller pieces of plant material therefrom and having smaller sieve openings for passage of the grain therethrough but relatively little of the plant material. The collected and cleaned grain, once through the sieves is then typically transported by conveyor or other means to a clean grain tank or bin on the combine, or to an accompanying grain receiving vehicle. The opening sizes of the chaffer and sieve are important parameters for controlling the amount or yield of grain that is recovered by the combine as opposed to discharged therefrom with the chaff and other unwanted plant material and crop residue. Accordingly, the chaffer and sieve opening sizes are typically set at the commencement of the harvesting operation, and may be reset at times during the harvesting operation, to achieve a desired crop yield rate.

A typical sieve construction includes a plurality of elongate parallel, pivotally mounted slats, each slat including a plurality of longitudinally spaced upwardly extending inclined fingers, the slats being pivotable through a range of open positions angularly oriented to horizontal for providing a corresponding range of openings or spaces between the fingers of adjacent ones of the slats. A typical sieve includes an adjusting member which contacts each of the slats, and a linkage and/or cable arrangement connected between the adjusting member and one or more manually or automatically movable adjusting elements or adjustors, in the latter instance, which can be moved by an actuator driven by an electrical, fluid, or other controller for moving the linkage or cable arrangement and member and thus changing the angular orientation of the slats and as a result, the opening size. The typical controller includes at least one processor operated by stored commands and/or inputs for controlling an electrical drive motor or the like for moving the actuator. An input device such as a push button or keypad and a display device are typically located in the operator cab of the combine for changing and showing the chaffer and sieve settings.

As combines have increased in capacity, the sieves have grown in size. Sieves are also typically removable for cleaning, service, and the like. Because of the larger size of the sieves, it is desirable for them to be divided into separately removable segments, for instance, a front segment and a rear segment, or a plurality of segments arranged in end to end order. And, because of the larger size, and other factors, such as uneven wear, it can be difficult to evenly adjust a sieve evenly across the extent thereof. Or, it may be desirable to adjust the segments differently, to achieve a desired cleaning effect. For instance, it may be desirable to set the opening size of the more frontward segments or segments at a more closed setting and the more rearward segment or segments more open, as towards the front end of the sieve there is typically more loose grain present, and toward the rear end there is typically more material other than grain such as larger pod or cob fragments, and the like.

As a result, what is sought is an adjusting mechanism for a sieve which does not increase the overall size or operating envelope of the sieve. It is also sought to provide a sieve which allows separate or joint adjustment of adjacent sieves or sieve segments, and also sieves of different types. Still further, the adjusting mechanism should allow for the removal of the sieves, and should be durable and long lasting.

SUMMARY OF THE INVENTION

According to the present invention, a sieve adjustment mechanism for controlling opening sizes of a plurality of sieve segments of a cleaning system of an agricultural combine, which provides one or more of the features and advantages sought above, and overcomes many of the problems and shortcomings identified above, is disclosed.

According to a preferred aspect of the invention, the mechanism is adapted for adjusting opening sizes of first and second sieve segments disposed in edge to edge or end to end relation. The mechanism includes a first adjusting element disposed so as to be movable in a predetermined manner for adjusting the opening size of the first sieve segment, and a second adjusting element disposed so as to be movable in a predetermined manner for adjusting the opening size of the second sieve element. The mechanism includes an actuating element in connection with the first adjusting element and operable for moving the first adjusting element in the predetermined manner, and first and second connecting elements disposed in connection with the first and second adjusting elements, respectively, the connecting elements being connectable for connecting the first and second adjusting elements together such that movement of the first adjusting element in the predetermined manner will cause movement of the second adjusting element in the predetermined manner, and the connecting elements being disconnectable for allowing the first adjusting element to be moved in the predetermined manner without causing movement of the second adjusting element.

As a result, for instance, the opening sizes of the sieve segments can be adjusted together, to the same opening size, and left at that size, or they can be adjusted together then the connecting elements disconnected, such that the opening size of the first sieve segment can be adjusted differently, as desired or required for a particular application.

According to another preferred aspect of the invention, the connecting elements include a rod in connection with one of the adjusting elements and a tube in connection with another of the adjusting elements, an end portion of the rod being disposed or cooperatively received in the tube and connectable thereto, or cooperatively engageable therewith, for movement of the rod therewith, and the rod being disconnectable from the tube to allow independent movement thereof, and the separate adjustment of the opening sizes. For instance, the rod and the tube can be connected together using a pinned connection, the pin being removable to allow the separate adjustment of the opening size of the first sieve segment, and also the removal of the sieve segments from the combine for cleaning or other purposes, as desired or required. Thereafter, if the sieve segments are reinstalled, or it is desired to again adjust the second sieve segment, the pin can be replaced.

A preferred manner of movement of the adjusting elements is a rotational movement, which can be effected by manual or automatic actuation, such as by a hand operated handle, or an electronic, fluid or other controlled actuator or controller. And, the adjusting elements can include, for instance a female threaded member such as a nut on a rotatable male threaded member such as a threaded rod or screw so as to be moved longitudinally by rotation of the rod or screw, and a finger engageable with slats or an adjusting member of a sieve movable by the longitudinal movement of the nut, for adjusting the opening size.

DETAILED DESCRIPTION OF THE INVENTION

Figure 1:
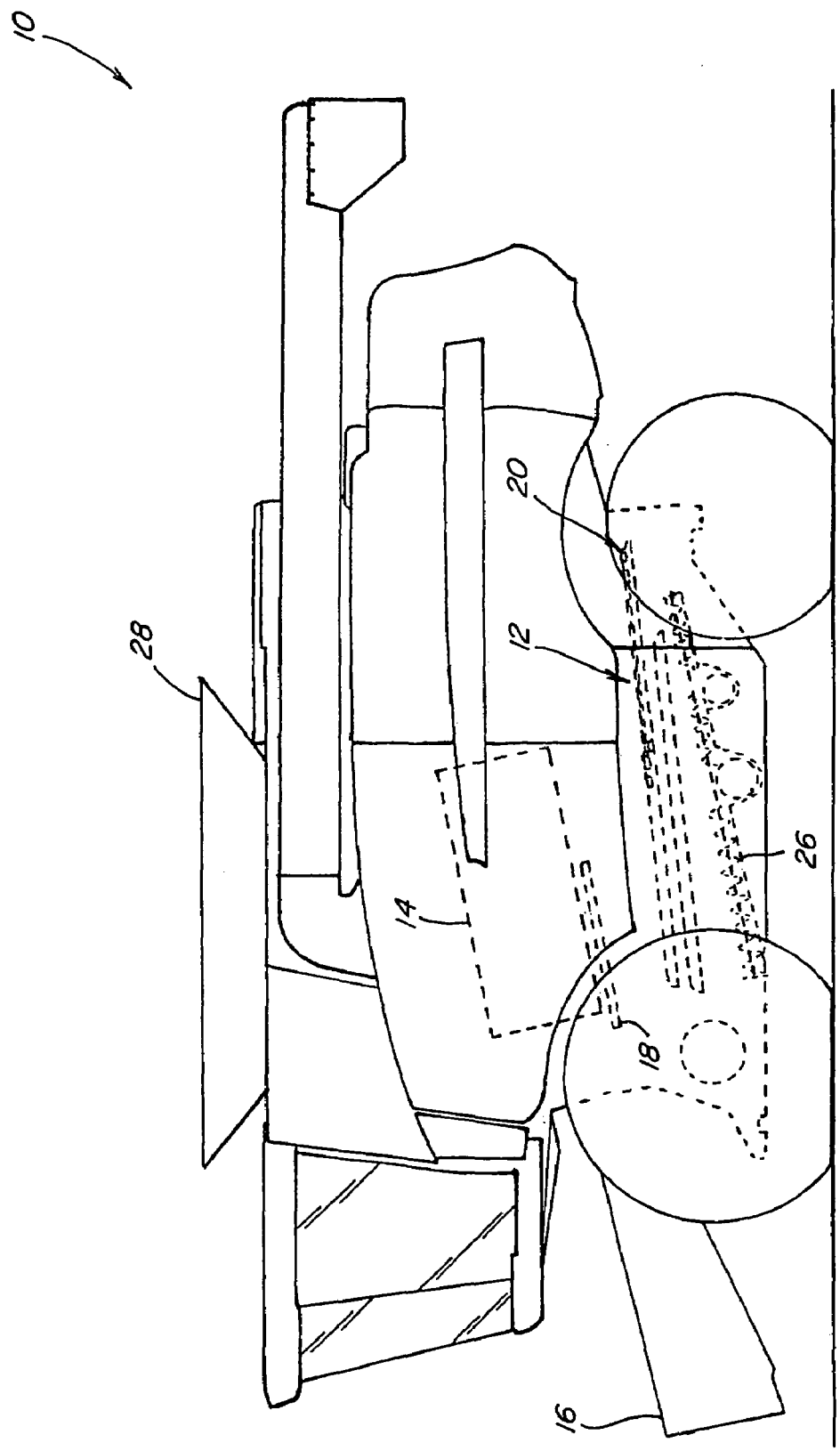
FIG. 1 is a simplified side elevational view of an agricultural combine including a sieve adjustment mechanism according to the present invention.
Figure 2:
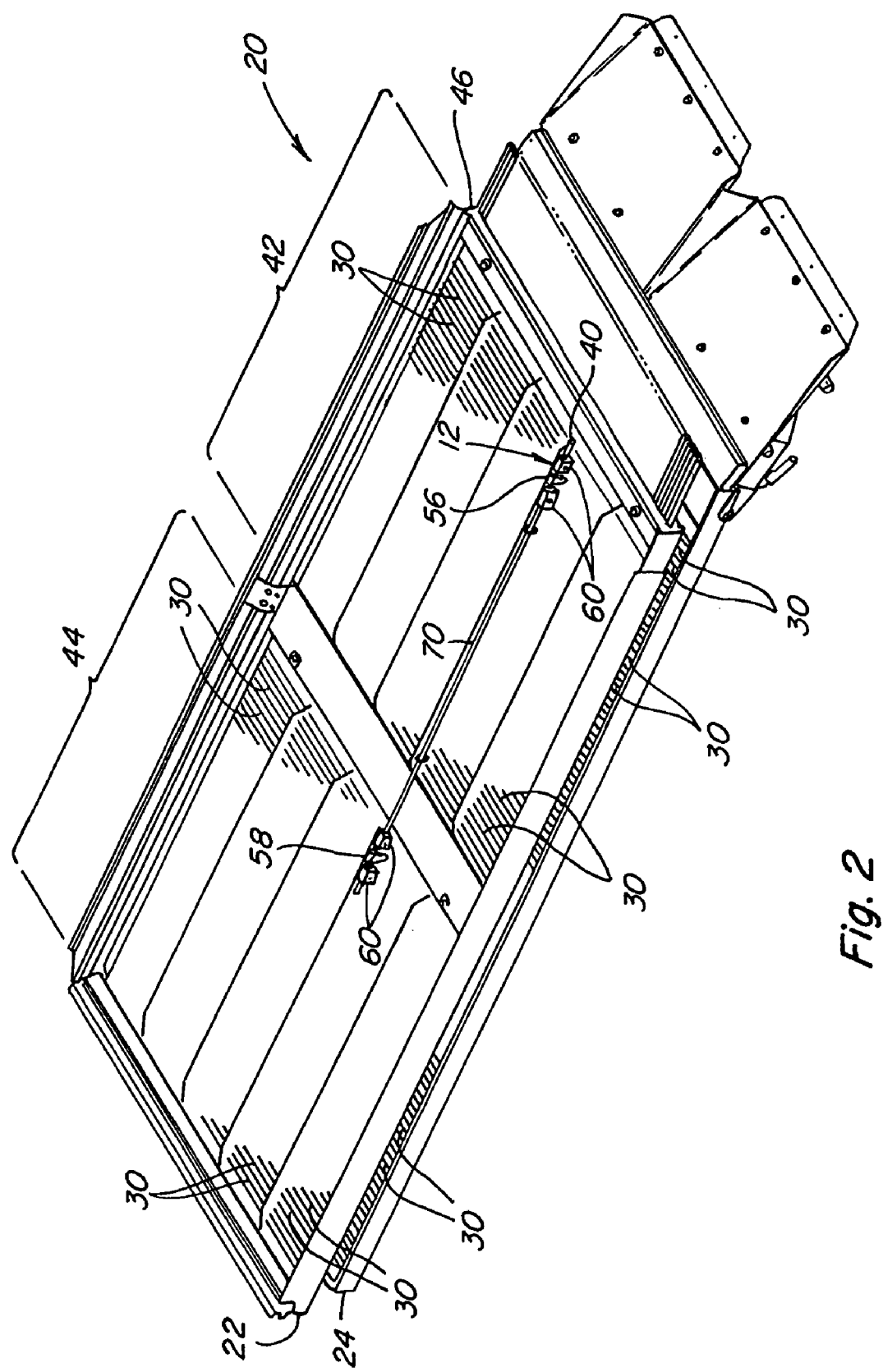
FIG. 2 is a simplified perspective view of sieves of a cleaning system of the combine of FIG. 1, showing the adjustment mechanism in connection with first and second sieve segments of the cleaning system.

Referring now to the drawings, in FIG. 1 a conventional agricultural combine 10 is shown, illustrating generally the location of a sieve adjustment mechanism 12 in connection therewith and constructed and operable according to the teachings of the present invention. Agricultural combine 10 generally includes a threshing mechanism or separator 14 operable for receiving crop material from a harvesting mechanism (not shown) on a front end 16 of combine 10, separator 14 being operable for separating smaller grains, seeds, pods and related plant material from larger stalks, stems, leaves, husks and other elements of the crop material, as well as vines, weeds and the like which may be present in the harvested crop material. The smaller material falls from separator 14 into one or more augers 18 disposed below separator 14, which collect the smaller material and convey it to a cleaning system 20.

Referring also to FIGS. 2, 3, 4, 5, 6, 7 and 8, cleaning system 20 includes an upper, coarser sieve, also known as a chaffer 22, positioned for receiving the material from the auger or augers, and a lower, finer sieve 24 which receives grain or seeds which pass through chaffer 22. Sieve 24, in turn, separates or cleans the grain or seed from the remaining other material, such as pod fragments and the like, for collection by a lower auger 26 (FIG. 1) which conveys the clean grain or seeds to an elevator which conveys the clean grain or seeds upwardly to a clean grain bin 28 (also FIG. 1). Chaffer 22 and sieve 24 are vibrated or reciprocated during operation by suitable means (not shown) for facilitating sifting of the crop material therethrough. Material which does not pass through is moved rearwardly on chaffer 22 or sieve 24 by the vibration or reciprocal action and is either blown or drops from the rear end thereof through an opening in the rear of combine 10 or into a return auger to be carried back to separator 14 or chaffer 22.

Figure 6:
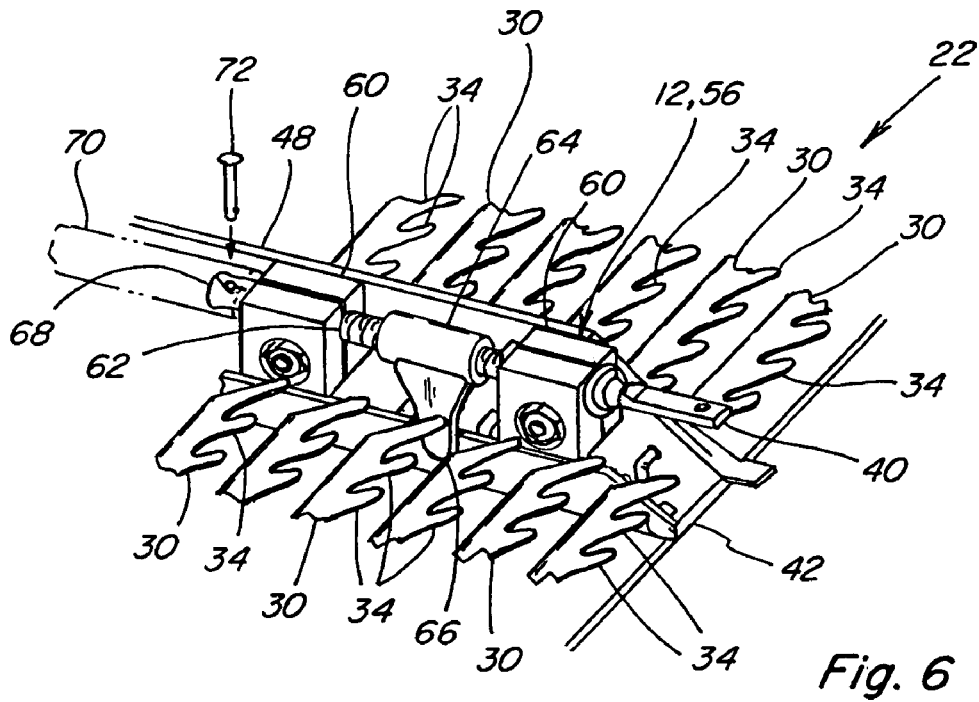
FIG. 6 is a fragmentary perspective view of a first adjusting element and connecting elements of the mechanism of the invention, illustrating making of a pinned connection of the connecting elements for connection of the first adjusting element to a second adjusting element.
Figure 7:
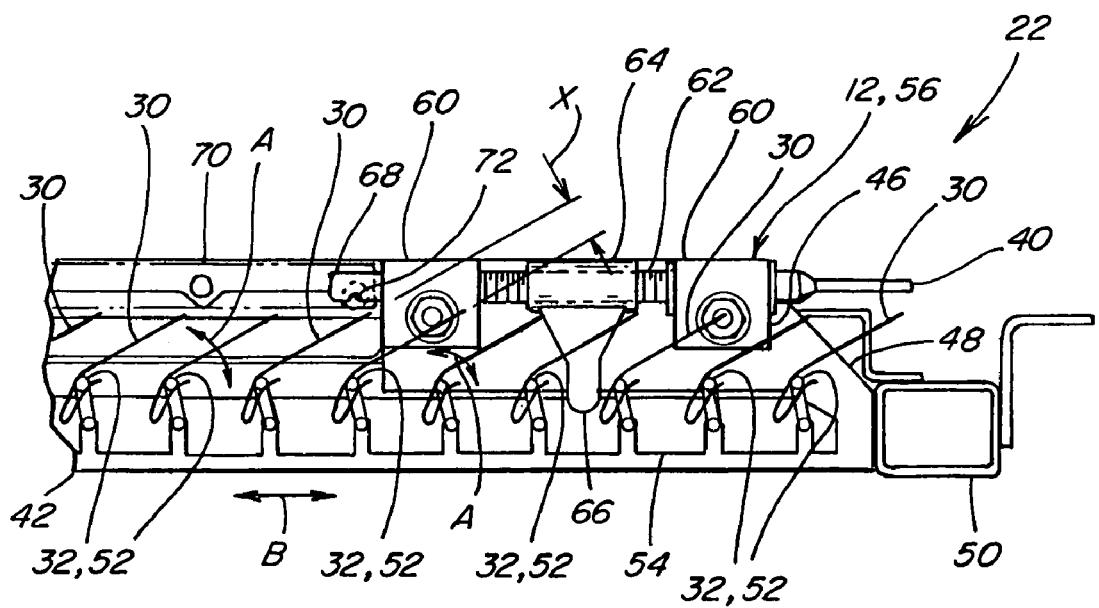
FIG. 7 is a fragmentary side view of the first adjusting element and connecting elements of FIG. 6.
Figure 8:
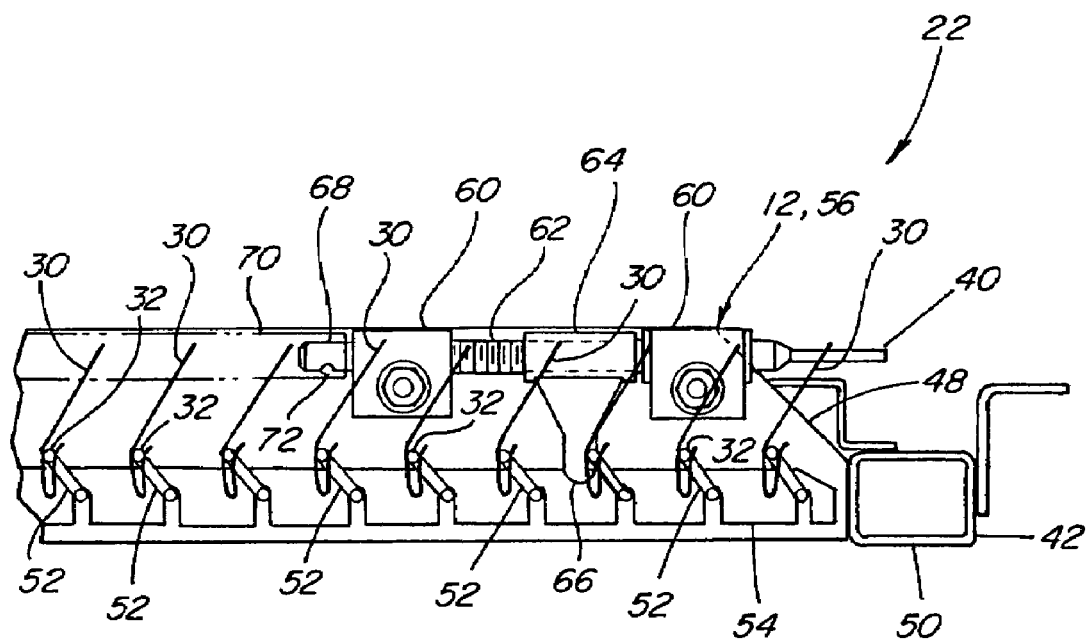
FIG. 8 is another fragmentary side view of the first adjusting element and connecting elements, showing the adjusting element moved for changing the opening size of a sieve.

Referring in particular to FIGS. 6, 7 and 8, chaffer 22 and sieve 24 are each of well known construction, as represented by chaffer 22. Chaffer 22 includes a plurality of elongate, horizontally extending slats 30, each slat being pivotable about a sidewardly extending generally horizontal pivotal axis 32. Each slat 30 is composed of a plurality of parallel, longitudinally spaced upward and downwardly inclined fingers 34, the fingers 34 of adjacent ones of slats 30 defining sieve openings therebetween, represented by distance X in FIG. 7, for the passage of only plant material of a desired maximum size therethrough, i.e., clean grain. Slats 30 are simultaneously pivotable about respective pivotal axes 32 through a range of pivotable positions for varying the opening size X of the sieve in the well known conventional manner, as denoted by arrows A. In this regard, slats 30 would be pivoted in a counterclockwise direction to increase the opening size X, and pivoted in the clockwise direction for decreasing the opening size X. Sieve 24 is adjustable in a similar manner.

Figure 3:
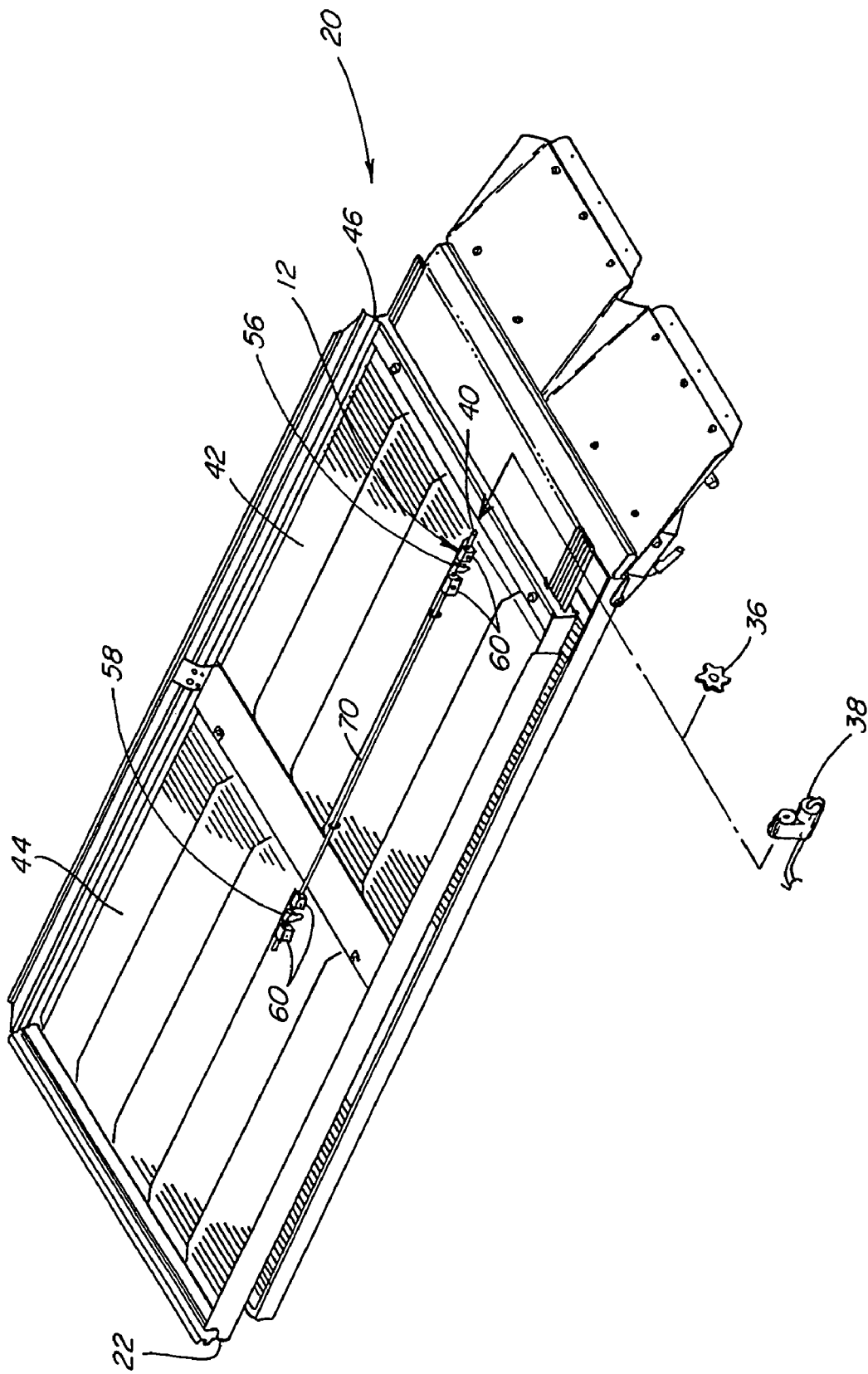
FIG. 3 is another simplified perspective view of the sieves and adjustment mechanism, illustrating alternative actuators for the adjustment mechanism.
Figure 4:
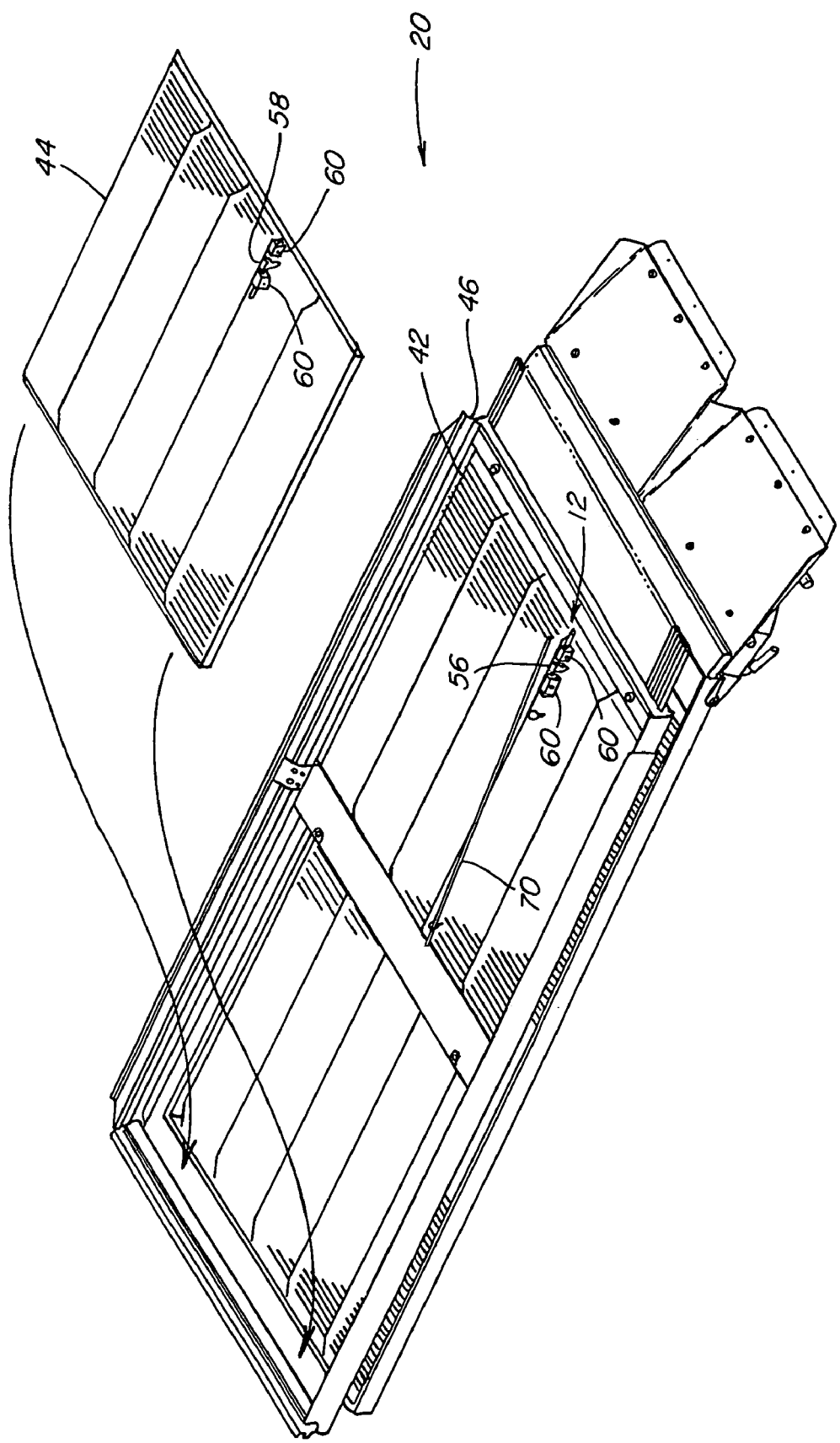
FIG. 4 is still another simplified perspective view of the sieves and adjustment mechanism, illustrating the second sieve segment removed from the cleaning system, and arrows illustrating reinstallation thereof.
Figure 5:
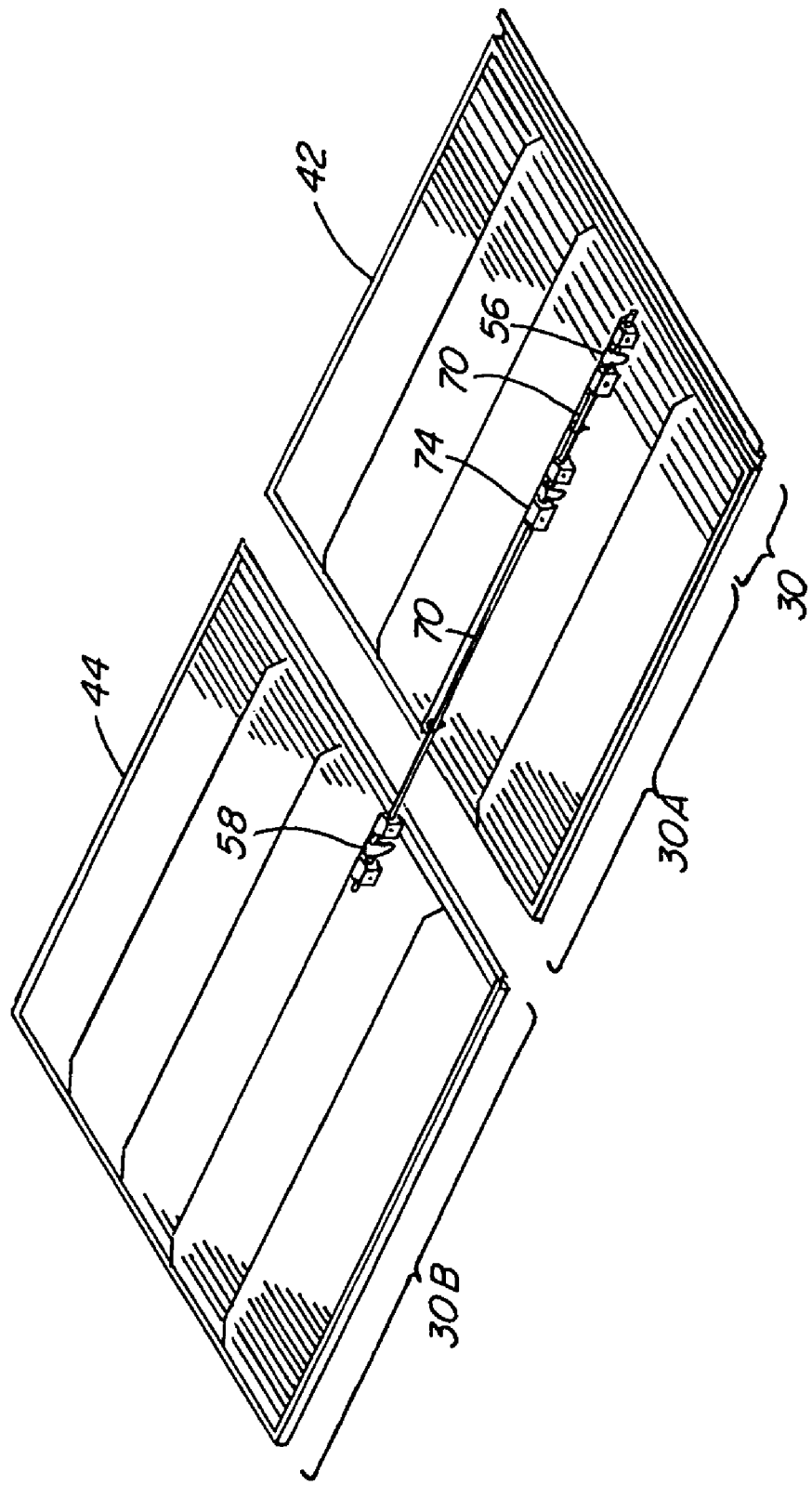
FIG. 5 is a simplified perspective view of a sieve including three groups of slats and adjustment mechanisms therefor according to the invention.

Sieve adjustment mechanism 12 is operable for simultaneously moving slats 30 through a predetermined range of pivotal positions for varying the opening size of chaffer 22, and for holding slats 30 at a position corresponding to a desired or selected opening size. Referring also to FIG. 3, to accomplish this, mechanism 12 preferably includes at least one actuator, such as, but not limited to, a conventional manual actuator 36 which can be, for instance, a hand operable handwheel or handle, or an automatic actuator, such as, for instance, an electric rotary actuator 38, a fluid controlled actuator, or the like. Actuators 36 and 38 can be connected by a suitable mechanical connecting element such as by a rotatable actuating rod 40, or one or more cables and/or linkages, to adjusting mechanism 12.

Here, it should be noted and observed that chaffer 22 is divided into segments, including a more rearwardly located first sieve segment 42, and a more forwardly located second sieve segment 44, located in edge to edge or end to end relation on and supported by a rectangular support frame 46. Each of the sieve segments 42 and 44 includes a plurality of the slats 30 described above, and is removable from frame 46 for service, cleaning and/or other desired or required purposes. Each sieve segment 42 and 44 includes a plurality of fore and aft extending ribs 48 connected between inwardly located cross members, represented by rear crossmember 50 of sieve segment 42 in FIGS. 7 and 8, which ribs 48 support slats 30 in parallel side by side relation for the pivotal movement just discussed, in connection with a plurality of elongate crank rods 52. Crank rods 52 are retained by and engaged with an elongate, fore and aft extending adjusting member 54 extending along one of ribs 48. Adjusting member 54 is movable in the fore and aft direction, as denoted by arrow B in FIG. 7, for rotating crank rods 52 to pivot slats 30 for varying the opening size of the sieve segment 42 or 44. Movements to the right will effect counterclockwise movements of crank rods 52 and slats 30 to increase opening size X, and movements to the left will effect clockwise movements, to decrease opening size.

Sieve adjustment mechanism 12 is configurable so as to be operable for jointly effecting such rotational movements of slats 30 of both first sieve segment 42 and second sieve segment 44, or effecting such rotational movements of slats 30 of only first sieve segment 42, such that the opening sizes of the two sieve segments can be the same, or different, as desired or required for a particular application. To provide this capability, mechanism 12 includes a first adjusting element disposed on first sieve segment 42, and a second adjusting element 58 disposed on second sieve segment 44. Each of adjusting elements 56 and 58 includes a pair of mounting blocks 60 fixedly mounted to a rib 48 in fore and aft spaced relation, by suitable fasteners such as bolts or the like. Each pair of blocks 60 supports and retains a male threaded member 62, such as a threaded rod or screw, for rotation in place therebetween, threaded member 62 of first adjusting element 56 also including rod 40, so as to be rotatable by manual actuator 36, or by an automatic actuator, such as electric rotary actuator 38. A female threaded member 64, which can be a nut or the like, is threadedly engaged with each male threaded member 62, respectively, and includes a downwardly extending adjusting tab 66. Each adjusting tab 66 is positioned to engage adjusting member 54 of the respective sieve segment, and is movable in the fore and aft directions by movements of male threaded member 62 of the adjusting element 56 or 58 in a predetermined manner, which, here, preferably is a rotational movement. Male threaded members 62 of adjusting elements 56 and 58 are connected together by connecting elements 68 and 70 for joint movement in the predetermined manner, that is, preferably for joint rotational movement, such that opening size of sieve segments 42 and 44 will be adjusted simultaneously by the rotational movement of the actuator, such as manual actuator 36 or rotary actuator 38. Alternatively, connecting elements 68 and 70 are disconnectable, to allow adjustment of opening size of sieve segment 42 only. As a result, sieve adjustment mechanism 12 of the invention can be utilized for jointly adjusting opening size of front sieve segment 42 and rear sieve segment 44, then connecting elements 68 and 70 can be disconnected, to allow singly adjusting opening size of just front sieve segment 42.

Connecting element 68 preferably comprises a short rod which is an extension of male threaded member 62 which extends forwardly beyond forwardmost mounting block 60 of first adjusting element 56, and connecting element 70 preferably comprises an elongate tube, or a rod, the rear end of which is open so as to cooperatively receive connecting element 68. Connecting elements 68 and 70 are preferably connectable together for joint movement in the predetermined manner, preferably rotation, using a pin 72 insertable through alignable holes in elements 68 and 70, and conveniently retainable therein, by suitable means such as a detent member, cotter pin, or the like. As a result, removal of pin 72 allows rotation of connecting element 68 independently of connecting element 70, for effecting the singular adjustment of opening size of first sieve segment 42. Similarly, reinstallation of pin 72, as illustrated in FIG. 6, allows joint adjustment of opening size. Additionally, with pin 72 removed, either or both of sieve segments 42 and 44 can be separately removed from support frame 46, as illustrated by removed sieve segment 44 in FIG. 4, the sieve segment being reinstallable in support frame 46, as illustrated by the arrows. Here, connecting element 70 is also shown disconnected from adjusting element 58 on sieve segment 44 removed from frame 46, to facilitate ease of removal of sieve segment 44 from the combine. In this regard, it should be noted that connecting element 70 can be connected to male threaded member 62 of second adjusting element 58 in any suitable manner, such as, but not limited to, by use of an additional connecting element 68 and pin 72 (not shown), to allow removal of sieve segment 44 only, if desired. Further in this regard, connecting elements 68 and 70 can be configured to allow connection thereof in only one, or in a limited number of, rotational positions one relative to the other, such that when reconnected, the opening setting of a selected one of the sieve segments 42 or 44 can be duplicated on the other of the sieve segments 42 or 44.

It is contemplated that the sieve adjustment mechanism of the invention can be utilized for providing more than just two different opening sizes for two or more ranges or sets of the slats of a sieve segment, such as sieve segments 42 and 44, or of one or more additional sieve segments, simply by using additional adjusting elements, as illustrated by use of third adjusting element 74, in connection with an additional adjusting member, on one or more of the sieve segments, such as first sieve segment 42. Thus, in this illustration first sieve segment 42 will include two of the adjusting members 54 (FIGS. 7 and 8), adjusting element 56 being in connection with one of the adjusting members, and adjusting element 74 being in connection with the other of the adjusting members, such that the slats associated with the respective adjusting members (here grouped as slats 30 and 30A, FIG. 5) can be adjusted to different opening sizes. This is with respect to one another, and also with respect to the opening sizes of the slats of the other sieve segment 44, denoted as slats 30B. Adjusting element 74 is connectable between adjusting elements 56 and 58 utilizing an additional set of connecting elements, illustrated by connecting element 70. Thus, with the connecting element 56, 58 and 74 connected together by connecting elements of the invention, the opening sizes of the groups of slats 30, 30A and 30B can be jointly adjusted, and either left at the same setting, or then differently adjusted, simply by disconnection of the connecting elements therebetween. As an illustration, after joint adjustment of the three groups of slats, connecting element 70 between adjusting elements 58 and 74 can be disconnected, to allow readjusting opening size of groups of slats 30 and 30A together. Then, connecting element 70 between adjusting elements 56 and 74 can be disconnected, to allow separately adjusting opening size of slats 30.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiments of the invention; however, concepts, as based upon the description, may be employed in other embodiments without departing from the scope of the invention. Accordingly, the following claims are intended to protect the invention broadly as well as in the specific form shown.

What is claimed is:

1. A mechanism for adjusting opening sizes of first and second sieve segments disposed in edge to edge relation along a first axis in an agricultural combine, comprising:

a first adjusting element disposed along the first axis of the first sieve segment and rotatable about the first axis for adjusting the opening size of the first sieve segment;

a second adjusting element disposed along the first axis of the second sieve segment and rotatable about the first axis for adjusting the opening size of the second sieve element;

an actuating element in connection with the first adjusting element and operable for moving the first adjusting element in rotational movement about the first axis; and first and second connecting elements disposed in connection with the first and second adjusting elements, respectively, the connecting elements being connectable for connecting the first and second adjusting elements together such that the rotational movement of the first adjusting element in the will cause joint rotational movement of the second adjusting element, and the connecting elements being disconnectable for allowing rotational movement of the first adjusting element about the first axis without causing rotational movement of the second adjusting element about the first axis.

2. The mechanism of claim 1, wherein the connecting elements comprise a rod in connection with one of the adjusting elements and a tube in connection with another of the adjusting elements, an end portion of the rod being disposed in the tube and connectable thereto for movement of the rod therewith, and the rod being disconnectable from the tube to allow independent movement thereof.

3. The mechanism of claim 2, wherein the rod is connectable by a removable pin to the tube for movement therewith.

4. The mechanism of claim 2, wherein disconnection the of the rod from the tube allows removal of the sieve sections from the combine.

5. The mechanism of claim 1, wherein the movement in the predetermined manner comprises a rotational movement.

6. The mechanism of claim 1, further comprising an actuator in connection with the first adjusting element and automatically operable for moving the first adjusting element in the predetermined manner.

7. The mechanism of claim 1, further comprising and actuator in connection with the first adjusting element and manually operable for moving the first adjusting element in the predetermined manner.

8. A cleaning system of an agricultural combine, comprising:

a first sieve segment disposed in end to end relation with a second sieve segment along a first axis; and an adjusting mechanism including a first adjusting element in connection with the first sieve segment and operable for holding fingers of the first sieve segment at a selectable opening size, the first adjusting element disposed along the first axis and rotatable about the first axis for adjusting the opening size, a second adjusting element in connection with the second sieve segment and operable for holding fingers of the second sieve segment at a selectable opening size, the second adjusting element disposed along the first axis and rotatable about the first axis for adjusting the opening size of the fingers of the second sieve segment, and a rod extending between and connected to the first and second adjusting elements, the rod being operable for rotating the second adjusting element about the first axis by rotating the first adjusting element about the first axis, the rod being connected to one of the adjusting elements by a connector which is disconnectable to allow rotation of the first adjusting element in about the first axis without rotating the second adjusting element.

9. The cleaning system of claim 8, wherein the first and second sieve segments are configured so as to be independently removable from the combine, and the first adjusting element is mounted on the first sieve segment, the second adjusting element is mounted on the second sieve segment, and the rod is connected to the first adjusting element by the connector, such that when the rod is disconnected from the first adjusting element, the rod is removable from the combine with the second sieve segment, separately of the first sieve segment.

10. The cleaning system of claim 8, wherein the predetermined manner comprises a rotational movement.

11. The cleaning system of claim 8, further comprising an actuator in connection with the first adjusting element and automatically operable for moving the first adjusting element in the predetermined manner.

12. The cleaning system of claim 8, further comprising an actuator in connection with the first adjusting element and manually operable for moving the first adjusting element in the predetermined manner.

13. A cleaning system of an agricultural combine, comprising:

first and second sieve segments disposed in end to end relation along a first axis and individually removable from the combine; and a first adjusting element disposed along the first axis of the first sieve segment and rotatable about the first axis, the first adjusting element operable for adjusting the positions of movable fingers of the first sieve segment;

a second adjusting element disposed along the first axis of the second sieve segment and rotatable about the first axis, the second adjusting element operable for adjusting the positions of movable fingers of the second sieve segment;

an adjusting mechanism configurable for jointly and simultaneously rotating the first and second adjusting elements about the first axis, thereby adjusting the positions of the movable fingers of the first and second sieve segments, and alternatively configurable for rotating only the first adjusting element about the first axis, thereby adjusting the positions of the movable fingers of only the first sieve segment, such that the movable fingers of the first and second sieve segments can be adjusted to the same position, or different positions.

14. The cleaning system of claim 13, wherein the first and second sieve segments are configured so as to be independently removable from the combine, and the adjusting mechanism includes a rod connected between first and second adjusting elements in connection with the first and second sieve segments, respectively, the rod being disconnectable from one of the adjusting elements to allow the independent removal of the sieve segments from the combine.

15. The cleaning system of claim 13, further comprising an actuator in connection with the adjusting mechanism.

16. The cleaning system of claim 15, wherein the actuator is manually operable.

17. The cleaning system of claim 15, wherein the actuator is automatically operable.

18. The cleaning system of claim 15, wherein the rod is rotatable when connected between the individual adjusting elements for adjusting the positions of the movable fingers of both of the sieve segments, and the rod is connectable to the one of the adjusting elements in a predetermined manner for positioning the movable fingers of both of the sieve segments in the same position.

* * * * *